US011972521B2

(12) United States Patent
Vaish et al.

(10) Patent No.: US 11,972,521 B2
(45) Date of Patent: Apr. 30, 2024

(54) MULTISENSORIAL PRESENTATION OF VOLUMETRIC CONTENT

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/899,970

(22) Filed: Aug. 31, 2022

(65) Prior Publication Data

US 2024/0070969 A1 Feb. 29, 2024

(51) Int. Cl.
  *G06T 15/08* (2011.01)
  *G06F 3/04815* (2022.01)

(52) U.S. Cl.
  CPC .......... *G06T 15/08* (2013.01); *G06F 3/04815* (2013.01)

(58) Field of Classification Search
  CPC .......................... G06T 15/08; G06F 3/04815
  See application file for complete search history.

(56) References Cited

U.S. PATENT DOCUMENTS

| | | | |
|---|---|---|---|
| 6,038,295 | A | 3/2000 | Mattes |
| 6,819,982 | B2 | 11/2004 | Doane |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 7,542,073 | B2 | 6/2009 | Li et al. |
| 8,131,597 | B2 | 3/2012 | Hudetz |
| 8,174,562 | B2 | 5/2012 | Hartman |
| 8,199,747 | B2 | 6/2012 | Rojas et al. |
| 8,274,550 | B2 | 9/2012 | Steuart, III |
| 8,332,475 | B2 | 12/2012 | Rosen et al. |
| 8,646,720 | B2 | 2/2014 | Shaw |

(Continued)

FOREIGN PATENT DOCUMENTS

| | | | | |
|---|---|---|---|---|
| CA | 2887596 | | 7/2015 | |
| CN | 105912129 A | * | 8/2016 | .............. G06F 3/011 |
| KR | 20210135859 | | 11/2021 | |

OTHER PUBLICATIONS

US 10,656,660 B1, 05/2020, Meisenholder et al. (withdrawn)

(Continued)

*Primary Examiner* — William A Beutel
(74) *Attorney, Agent, or Firm* — Schwegman Lundberg & Woessner, P.A.

(57) ABSTRACT

Input indicative of a selection of volumetric content for presentation is received. The volumetric content comprises a volumetric representation of one or more elements of a real-world three-dimensional space. In response to the input, device state data associated with the volumetric content is accessed. The device state data describes a state of one or more network-connected devices associated with the real-world three-dimensional space. The volumetric content is presented. The presentation of the volumetric content includes presentation of the volumetric representation of the one or more elements overlaid on the real-world three-dimensional space by a display device and configuring the one or more network-connected devices using the device state data.

20 Claims, 11 Drawing Sheets

(56) References Cited

U.S. PATENT DOCUMENTS

| | | | |
|---|---|---|---|
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,235,932 B2 | 1/2016 | Choi et al. | |
| 9,344,642 B2 | 5/2016 | Niemi et al. | |
| 9,345,711 B2 | 5/2016 | Friedhoff | |
| 9,443,227 B2 | 9/2016 | Evans et al. | |
| 9,471,059 B1 | 10/2016 | Wilkins | |
| 9,489,661 B2 | 11/2016 | Evans et al. | |
| 9,489,937 B1 | 11/2016 | Beard et al. | |
| 9,491,134 B2 | 11/2016 | Rosen et al. | |
| 9,576,369 B2 | 2/2017 | Venkataraman et al. | |
| 9,589,448 B1 | 3/2017 | Schneider et al. | |
| 9,681,046 B2 | 6/2017 | Adsumilli et al. | |
| 9,723,272 B2 | 8/2017 | Lu et al. | |
| 9,747,901 B1 | 8/2017 | Gentry | |
| 9,922,659 B2 | 3/2018 | Bradlow et al. | |
| 9,989,965 B2 | 6/2018 | Cuban et al. | |
| 10,061,328 B2 | 8/2018 | Canoy et al. | |
| 10,109,224 B1 | 10/2018 | Ratti et al. | |
| 10,140,987 B2 | 11/2018 | Erickson et al. | |
| 10,168,700 B2 | 1/2019 | Gordon et al. | |
| 10,370,118 B1 | 8/2019 | Nielsen et al. | |
| 10,501,180 B2 | 12/2019 | Yu | |
| 10,768,639 B1 | 9/2020 | Meisenholder et al. | |
| 11,126,206 B2 | 9/2021 | Meisenholder et al. | |
| 2007/0250526 A1 | 10/2007 | Hanna | |
| 2008/0081676 A1* | 4/2008 | Chakraborty | G05B 19/4185 455/574 |
| 2008/0255842 A1 | 10/2008 | Simhi | |
| 2009/0122133 A1 | 5/2009 | Hartman | |
| 2011/0202598 A1 | 8/2011 | Evans et al. | |
| 2012/0194420 A1 | 8/2012 | Osterhout et al. | |
| 2012/0209924 A1 | 8/2012 | Evans et al. | |
| 2012/0281885 A1 | 11/2012 | Syrdal et al. | |
| 2012/0287274 A1 | 11/2012 | Bevirt | |
| 2013/0056581 A1 | 3/2013 | Sparks | |
| 2013/0238168 A1 | 9/2013 | Reyes | |
| 2014/0254896 A1 | 9/2014 | Zhou et al. | |
| 2015/0022432 A1 | 1/2015 | Stewart et al. | |
| 2015/0070272 A1 | 3/2015 | Kim et al. | |
| 2015/0175263 A1 | 6/2015 | Reyes | |
| 2015/0199022 A1 | 7/2015 | Gottesman et al. | |
| 2015/0287246 A1 | 10/2015 | Huston et al. | |
| 2015/0331490 A1 | 11/2015 | Yamada | |
| 2015/0362917 A1 | 12/2015 | Wang et al. | |
| 2016/0063987 A1 | 3/2016 | Xu et al. | |
| 2016/0161946 A1 | 6/2016 | Wuth Sepulveda et al. | |
| 2016/0179096 A1 | 6/2016 | Bradlow et al. | |
| 2016/0292886 A1 | 10/2016 | Erad et al. | |
| 2016/0307573 A1 | 10/2016 | Wobrock | |
| 2016/0336020 A1 | 11/2016 | Bradlow et al. | |
| 2017/0031369 A1 | 2/2017 | Liu et al. | |
| 2017/0094259 A1 | 3/2017 | Kouperman et al. | |
| 2017/0099424 A1 | 4/2017 | Jones | |
| 2017/0102699 A1 | 4/2017 | Anderson | |
| 2017/0177925 A1 | 6/2017 | Volkart | |
| 2017/0225796 A1 | 8/2017 | Sun et al. | |
| 2017/0228690 A1 | 8/2017 | Kohli | |
| 2017/0244937 A1 | 8/2017 | Meier et al. | |
| 2017/0320564 A1 | 11/2017 | Kuzikov | |
| 2017/0337791 A1 | 11/2017 | Gordon-Carroll | |
| 2017/0371353 A1 | 12/2017 | Millinger, III | |
| 2018/0082682 A1 | 3/2018 | Erickson et al. | |
| 2018/0098059 A1* | 4/2018 | Valdivia | G06F 3/011 |
| 2018/0246529 A1 | 8/2018 | Hu et al. | |
| 2018/0288364 A1* | 10/2018 | Virhiä | G11B 27/34 |
| 2019/0011921 A1 | 1/2019 | Wang et al. | |
| 2020/0241575 A1 | 7/2020 | Meisenholder et al. | |
| 2021/0289317 A1 | 9/2021 | Son et al. | |
| 2021/0327145 A1* | 10/2021 | Noorkami | H04N 21/23412 |
| 2021/0362848 A1 | 11/2021 | Spencer | |
| 2021/0382503 A1 | 12/2021 | Meisenholder et al. | |
| 2022/0198603 A1 | 6/2022 | Goodrich et al. | |
| 2022/0244835 A1 | 8/2022 | Faulkner et al. | |

OTHER PUBLICATIONS

Laput, Gierad, "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: URL: http: www.theregister.co.uk 2005 12 12 stealthtext, (Dec. 12, 2005), 1 pg.

Meisenholder, David, "Remoteless Control of Drone Behavior", U.S. Appl. No. 15/640,143, filed Jun. 30, 2017, 108 pgs.

Pourmehr, Shokoofeh, You two! Take off!': Creating, Modifying, and Commanding Groups of Robots Using Face Engagement and Indirect Speech in Voice Commands, IEEE RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

"International Application Serial No. PCT US2023 031066, International Search Report mailed Dec. 15, 2023", 3 pgs.

"International Application Serial No. PCT US2023 031066, Written Opinion mailed Dec. 15, 2023", 3 pgs.

* cited by examiner

MULTISENSORIAL PRESENTATION OF VOLUMETRIC CONTENT

TECHNICAL FIELD

The present disclosure generally relates to mobile and wearable computing technology. In particular, example embodiments of the present disclosure address systems, methods, and user interfaces for providing a multisensorial presentation of volumetric content.

BACKGROUND

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. Examples of audio and visual content include pictures, texts, logos, animations, and sound effects. A device that supports AR experiences in any one of these approaches is referred to herein as an "AR device."

For some example AR devices, audio and visual content or the visual effects are applied to media data such as a live image stream. Other example AR devices include head-worn devices that may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. A user of the head-worn device may access and use a computer software application to perform various tasks or engage in an entertaining activity. To use the computer software application, the user interacts with a 3D user interface provided by the head-worn device.

The so-called "Internet of Things" or "IoT" is a network of physical objects (referred to as "smart devices" or "IoT devices") that are embedded with sensors, software, and other technologies for enabling connection and exchange of data with other devices via the Internet. For example, IoT devices are used in home automation to control lighting, heating and air conditioning, media and security systems, and camera systems. A number of IoT-enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the IoT infrastructure to achieve more efficient IoT operations, improve human-machine interactions, and enhance data management and analytics.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
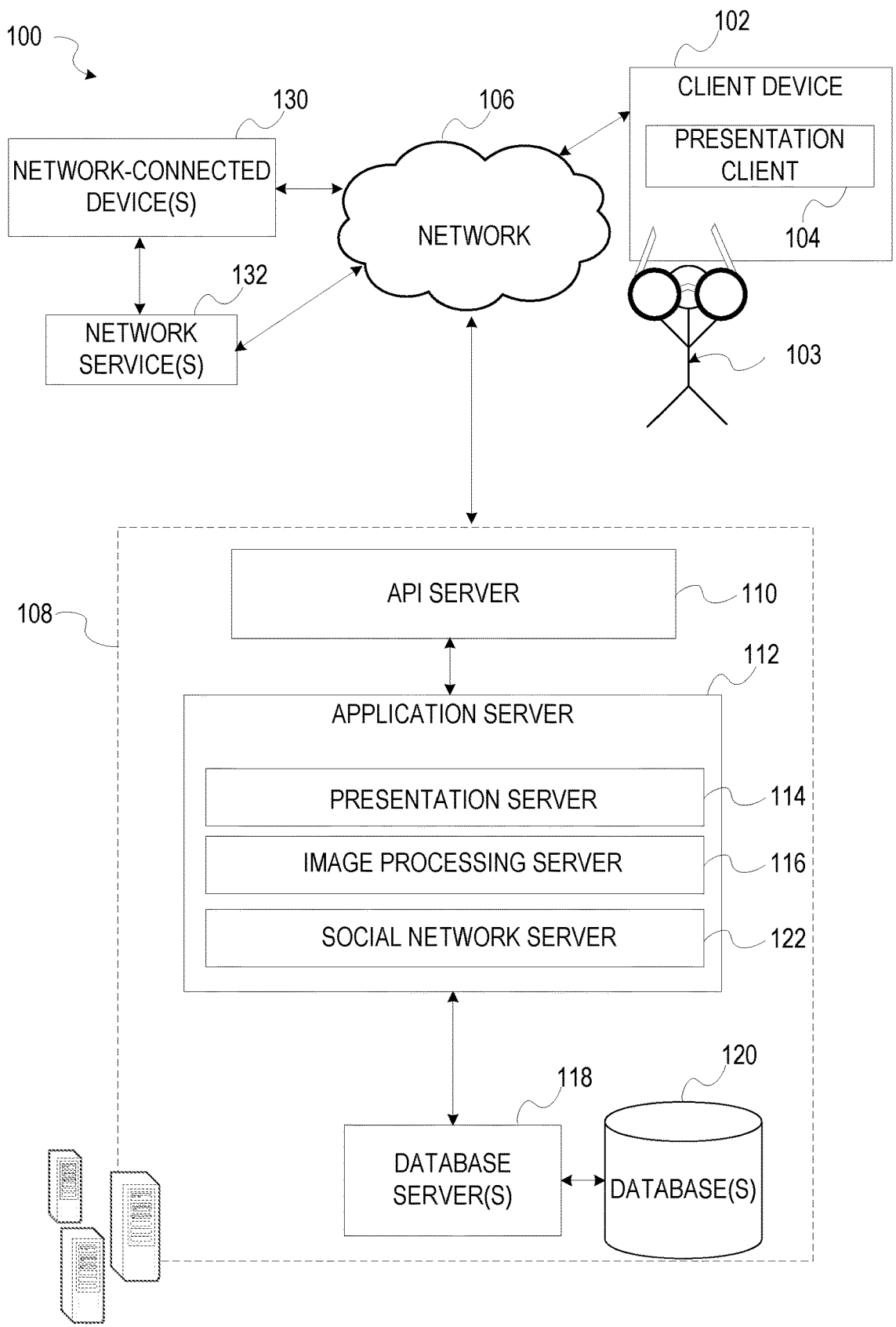
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an augmented reality (AR) experience. Volumetric content can include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

Conventional volumetric content systems lack mechanisms to support a fully immersive AR experience beyond merely displaying volumetric content. That is, conventional volumetric content systems typically only provide limited engagement with users' sense of sight and sound while failing to provide interactions with the users' other senses, thereby lowering the perception of realism that AR experiences intend to provide through presentation of volumetrically captured moments.

Aspects of the present disclosure include systems, methods, techniques, instruction sequences, and computing machine program products to provide multisensory presentations of volumetric content. To this end, the volumetric presentation system associates device state information with volumetric content, and the system configures one or more network-connected devices (e.g., IoT devices) using the device state information as part of presenting volumetric content. In this way, devices associated with the volumetric capture of a user experience can be configured to behave or operate during presentation of volumetric content in the same manner as they were during the volumetric capture, thereby aiding in a recreation of aspects of a volumetrically captured real-world environment at the time of the volumetric capture to provide an AR experience that allows users to reexperience previous moments and memories in a similar manner in which they were experienced initially, almost creating a deja vu-like feeling.

In a first example, volumetric capture techniques are used to generate volumetric content that depicts a baby's first walk. During the volumetric capture, a family is in the living room, lights are on, a smart speaker is playing background music, parents are drinking coffee and watching TV, A/C is on—when the baby starts walking with toys lying around. A capture system captures (e.g., using a camera rig, phone or other setup) the baby's walk and toys as a volumetric scene and collects state information defining the state of all network-connected devices. To create a multi-sensorial AR experience in presenting the volumetric content, the volumetric content presentation system triggers all the network-connected devices and projects volumetric representations of the baby's walk in AR. More specifically, the presentation system causes: an AR device to present a volumetric representation of the baby walking with toys; an audio device coupled with the AR device to present recorded conversations from the moment; the light to turn on; the TV to start playing the same movie that was playing during the baby's walk; the A/C (controlled by a smart thermostat) to turn on to bring the room to the same temperature; a smart coffee machine to brew the same coffee; and a smart speaker to play the same music.

In a second example, volumetric capture techniques can be used to generate volumetric content that depicts a road trip by two friends. In this example, the two friends use wearable smart glasses to record videos and take photos to capture their experience together on a road trip in Fall. As Summer begins, the friends decide to take the same road trip again. The friends may select the volumetric content for presentation as the car pulls up the same route that the friends took last time. The volumetric content presentation system uses an AR device to project the colors of Fall to green trees in Summer, taking the friends back to that season. The presentation of the volumetric content may also allow the two friends to view a volumetric representation of themselves at the exact same locations, like watching an AR movie of themselves in which they are the star. The volumetric content presentation system may further cause: an audio device to play the same playlist of songs play during the trip at specific locations; a navigation system to suggest stops at the same restaurants and coffee shops so that the friends can relive the same experiences; and the A/C in the car and the seat positioning to return to the same state as during the volumetric capture. Using a combination of AR display and network-connected smart devices, the presentation system aims to recreate the same scene from the past and invoke all five senses, the way they felt the first time.

Consistent with some embodiments, the volumetric presentation system generates experience data comprising volumetric content and device state data associated with the volumetric content. The volumetric content comprises a volumetric representation of one or more elements of a real-world three-dimensional space. The device state data comprises a state of at least one network connected device associated with the real-world three-dimensional space. In response to receiving a request to present the volumetric content, the volumetric content presentation system accesses the device state data associated with the volumetric content and uses the device state data to configure the one or more network-connected devices as part of the presentation of the volumetric content, which also includes causing a display device to present the volumetric representations of the one or more elements of the real-world three-dimensional space.

FIG. 1 is a block diagram showing an example volumetric content presentation system 100 for presenting volumetric content. The volumetric content presentation system 100 includes of a client device 102. The client device 102 hosts a number of applications including a presentation client 104. Each presentation client 104 is communicatively coupled to a presentation server system 108 via a network 106 (e.g., the Internet). In an example, the client device 102 is a wearable device (e.g., smart glasses) worn by the user 103 that includes a camera and optical elements that include a transparent display through which the real-world environment is visible to the user 103.

A presentation client 104 is able to communicate and exchange data with another presentation client 104 and with the presentation server system 108 via the network 106. The data exchanged between the presentation client 104, and between another presentation client 104 and the presentation server system 108, includes functions (e.g., commands to invoke functions) as well as payload data (e.g., text, audio, video or other multimedia data).

The presentation server system 108 provides server-side functionality via the network 106 to a particular presentation client 104. While certain functions of the volumetric content presentation system 100 are described herein as being performed by either a presentation client 104 or by the presentation server system 108, the location of certain functionality either within the presentation client 104 or the presentation server system 108 is a design choice. For example, it may be technically preferable to initially deploy certain technology and functionality within the presentation server system 108, but to later migrate this technology and functionality to the presentation client 104 where the client device (102) has a sufficient processing capacity.

The presentation server system 108 supports various services and operations that are provided to the presentation client 104. Such operations include transmitting data to, receiving data from, and processing data generated by the presentation client 104. This data may include volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the presentation client 104.

Turning now specifically to the presentation server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the API server 110 provides a set of interfaces (e.g., routines and protocols) that can be called or queried by the presentation client 104 in order to invoke functionality of the application server 112. The API server 110 exposes various functions supported by the application server 112, including account registration, login functionality, the sending of messages, via the application server 112, from a particular presentation client 104 to another presentation client 104, the sending of media files (e.g., volumetric videos) to the presentation client 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the presentation client 104).

The application server 112 hosts a number of applications and subsystems, including a presentation server 114, an image processing server 116 and a social network server 122. The presentation server 114 is generally responsible for managing volumetric content and facilitating presentation thereof by the client device 102. The image processing server 116 is dedicated to performing various image processing operations, typically with respect to images or video generated and displayed by the client device 102. The presentation server 114 and image processing server 116 may work in conjunction to provide one or more AR experiences to the user 103. For example, the presentation server 114 and image processing server 116 may work in conjunction to support presentation of volumetric content by the client device 102. Further details regarding presentation of volumetric content are discussed below.

The social network server 122 supports various social networking functions and services, and makes these functions and services available to the presentation server 114. To this end, the social network server 122 maintains and accesses an entity graph within the database 120. Examples of functions and services supported by the social network server 122 include the identification of other users of the volumetric content presentation system 100 with which a particular user has relationships or is "following", and also the identification of other entities and interests of a particular user.

The application server 112 is communicatively coupled to a database server 118, which facilitates access to a database 120 in which is stored data associated with content presented by the presentation server 114 and image processing server 116.

The presentation server system 108 may further communicate and exchange data with one or more network-connected devices 130. For some devices, the presentation server system 108 may communicate and exchange data directly with a network-connected devices 130 while in other instances the presentation server system 108 may communicate and exchange data with a network-connected device 130 via a network-service 132 (e.g., a third-party application). The network-service 132 may, for example, expose one or more APIs for communicating with a network-connected device 130. Examples of data communicated between the presentation server system 108 and the one or more network-connected devices include device state data and sensor data along with or as part of various requests and commands. As shown in FIG. 1, in some embodiments, the client device 102 (e.g., display device such as glasses 200 in FIG. 2A) is distinct from network-connected devices 130.

The term "network-connected devices" as used herein includes devices known to those skilled in the art as "IoT devices." As such, a network-connected device 130 may include common household and other devices that a standard end user might encounter such as smart lamps and lightbulbs, thermostats, smart televisions, smart speakers, smart switches, smart appliances (e.g., washers, dryers, ranges, and microwaves), navigation systems, and the like.

Figure 2A:
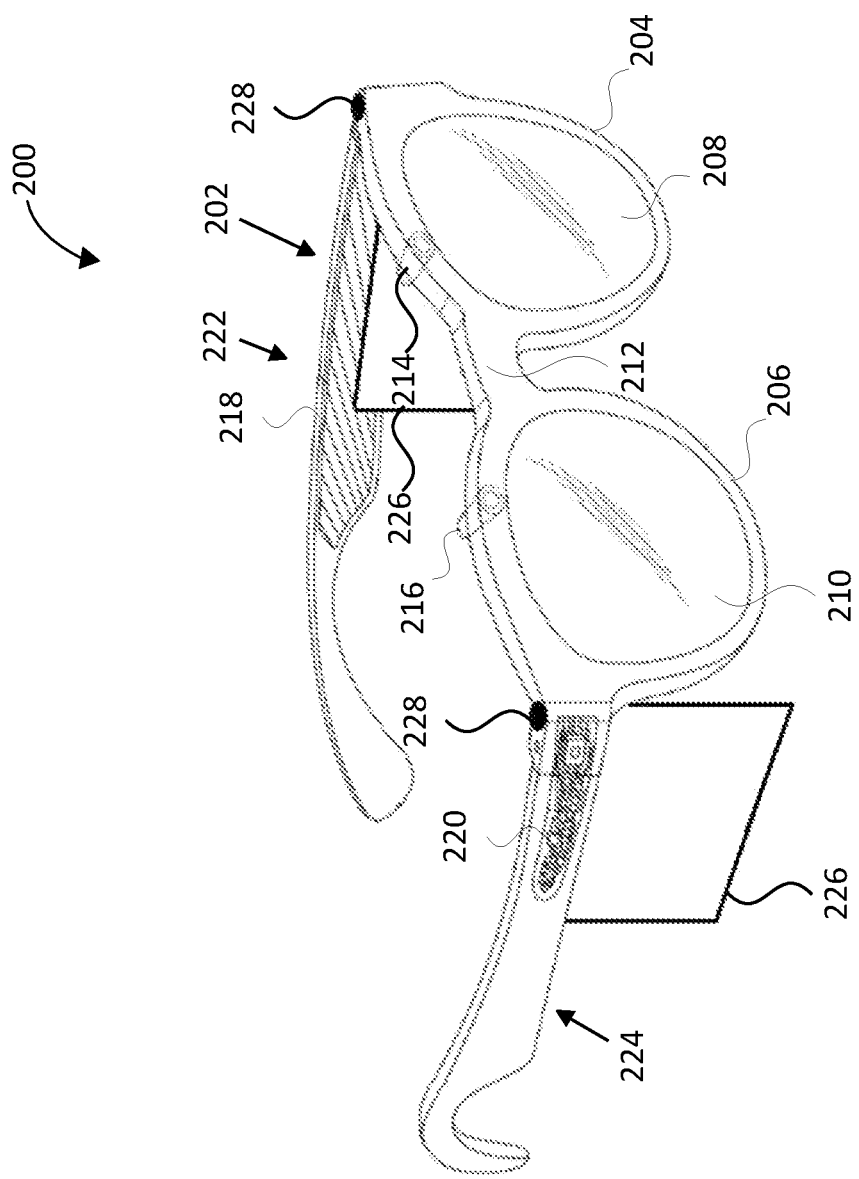
FIG. 2A is a perspective view of a head-worn device, in accordance with some example embodiments.

FIG. 2A is perspective view of a head-worn display device (e.g., glasses 200), in accordance with some examples. The glasses 200 are an example of the client device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as illustrated by the data processor 302 discussed below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real-world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

Figure 2B:
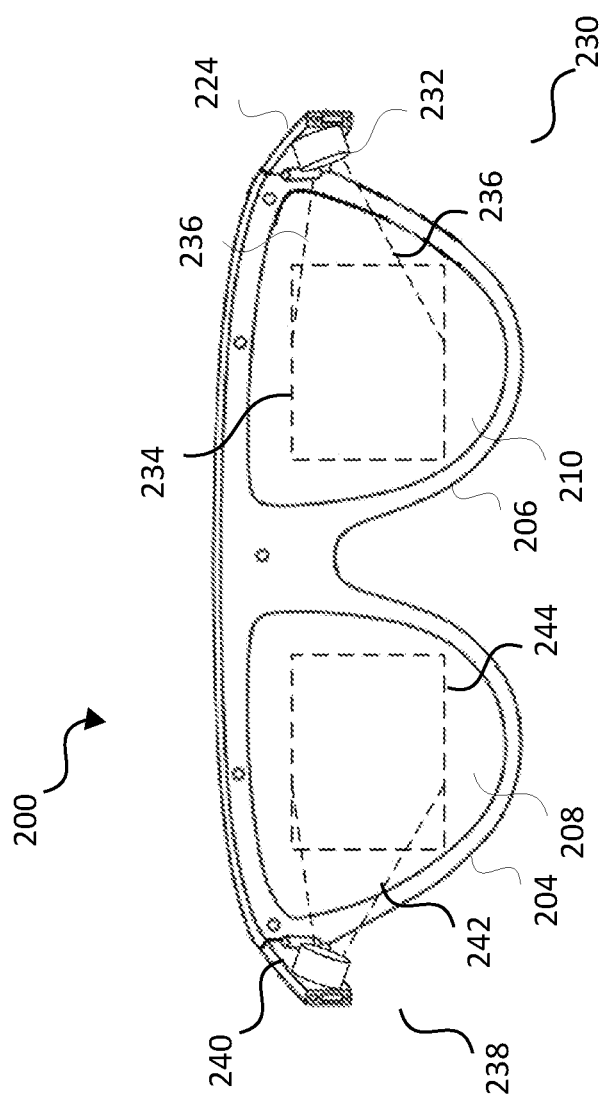
FIG. 2B illustrates a further view of the head-worn device of FIG. 2A, in accordance with some example embodiments.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the projector 232 encounters the diffractive structures of the waveguide of the near eye display 234, which directs the light towards the right eye of a user to provide an image on or in the right optical element 210 that overlays the view of the real world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real world seen by the user. The combination of a GPU, the forward optical assembly 230, the left optical element 208, and the right optical element 210 provide an optical engine of the glasses 200. The glasses 200 use the optical engine to generate an overlay of the real world view of the user including display of a 3D user interface to the user of the glasses 200.

It will be appreciated however that other display technologies or configurations may be utilized within an optical engine to display an image to a user in the user's field of view. For example, instead of a projector 232 and a waveguide, an LCD, LED or other display panel or surface may be provided.

In use, a user of the glasses 200 will be presented with information, content and various 3D user interfaces on the near eye displays. As described in more detail herein, the user can then interact with the glasses 200 using a touchpad 226 and/or the buttons 228, voice inputs or touch inputs on an associated device (e.g. client device 328 illustrated in FIG. 3), and/or hand movements, locations, and positions detected by the glasses 200.

Figure 3:
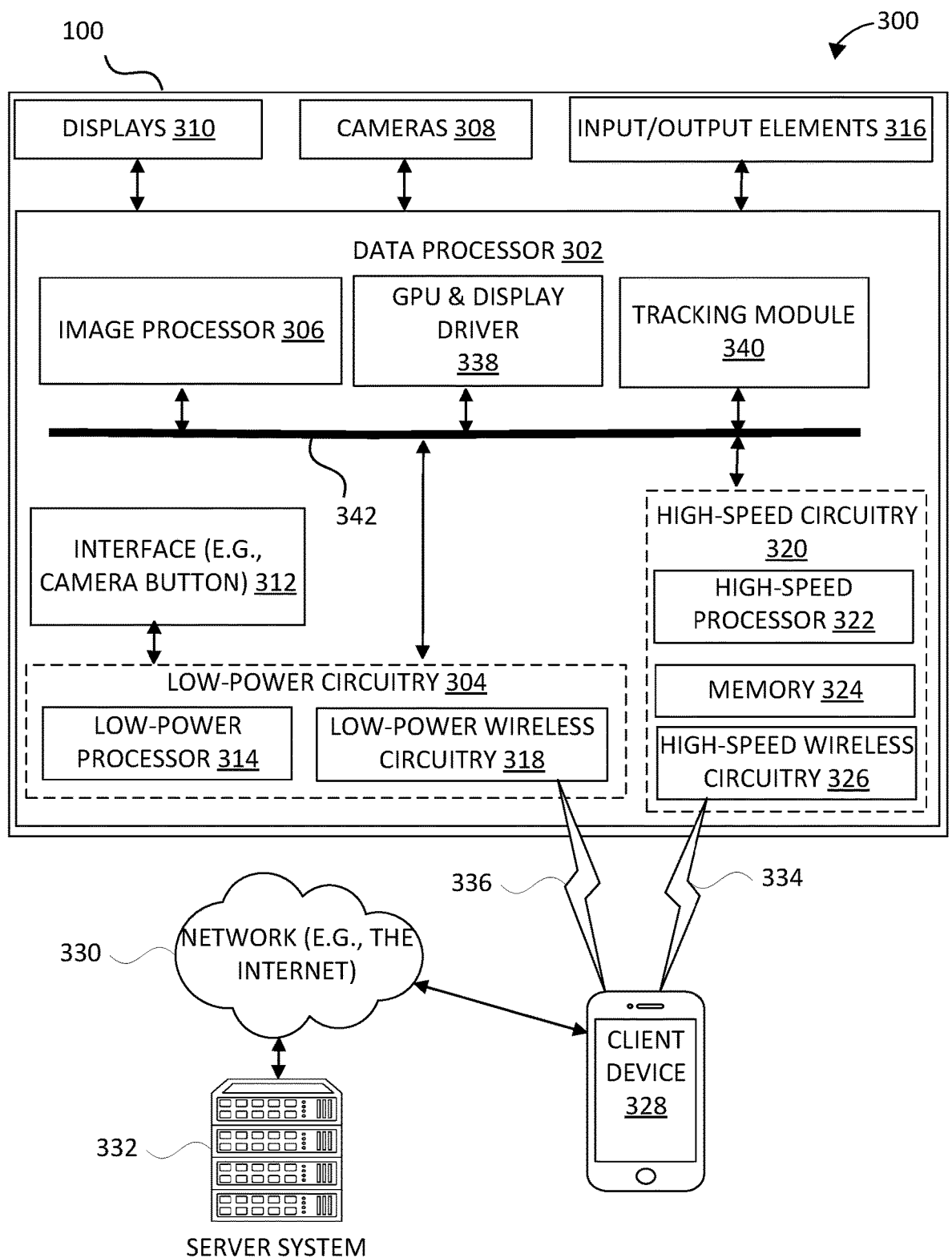
FIG. 3 is a block diagram illustrating a networked system including details of the head-worn device of FIG. 1, in accordance with some example embodiments.

FIG. 3 is a block diagram illustrating a networked system 300 including details of the glasses 200, in accordance with some examples. The networked system 300 includes the glasses 200, a client device 328, and a server system 332. The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 906 or the machine 1000 described in FIG. 9 and FIG. 10 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 9 and FIG. 10. For example, the input/output elements 316 may include any of I/O components 1018 including output components 1026, motion components 1034, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system such as the operating system 902 of FIG. 5. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and the position components 1038, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual objects relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
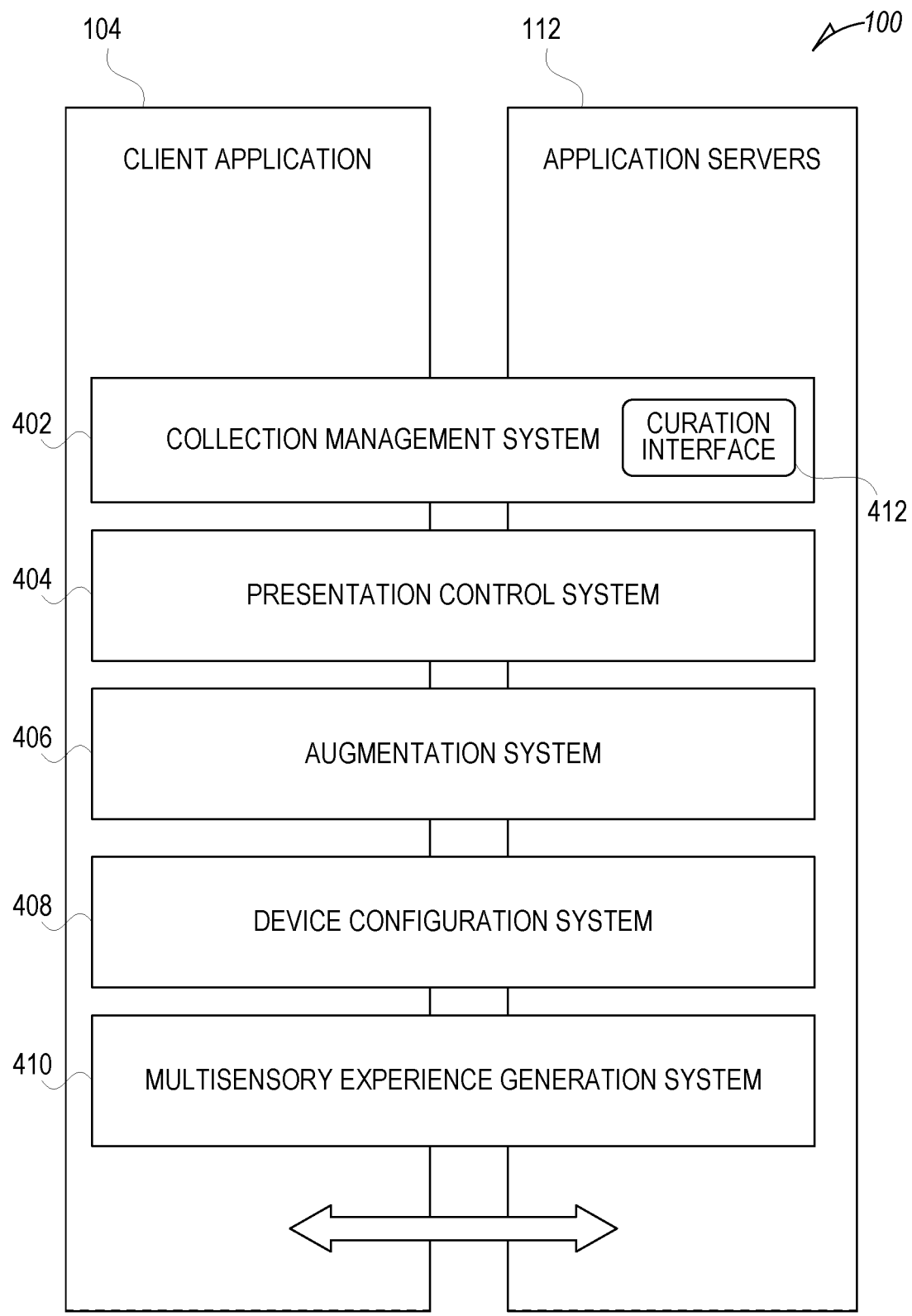
FIG. 4 is a diagrammatic representation of the volumetric content presentation system, in accordance with some examples, that has both client-side and server-side functionality.

FIG. 4 is a block diagram illustrating further details regarding the volumetric content presentation system 100, according to some examples. Specifically, the volumetric content presentation system 100 is shown to comprise the presentation client 104 and the application servers 112. The volumetric content presentation system 100 embodies a number of subsystems, which are supported on the client-side by the presentation client 104 and on the sever-side by the application servers 112. These subsystems include, for example, a collection management system 402, a presentation control system 404, an augmentation system 406, a device configuration system 408, and multisensory experience generation system 410.

The collection management system 402 is responsible for managing sets or collections of content (e.g., collections of text, image, video, and audio data). A collection of content may be organized into an "event gallery" or an "event story." Such a collection may be made available for a specified time period, such as the duration of an event to which the content relates. For example, content relating to a music concert may be made available as a "story" for the duration of that music concert. The collection management system 402 may also be responsible for publishing an icon that provides notification of the existence of a particular collection to the user interface of the presentation client 104.

The collection management system 402 furthermore includes a curation interface 412 that allows a collection manager to manage and curate a particular collection of content. For example, the curation interface 412 enables an event organizer to curate a collection of content relating to a specific event (e.g., delete inappropriate content or redundant messages). Additionally, the collection management system 402 employs machine vision (or image recognition technology) and content rules to automatically curate a content collection.

The presentation control system 404 is responsible for facilitating and controlling volumetric content presentation. As such, the presentation control system 404 provides a mechanism that allows users to specify control operations for controlling volumetric content presentation. Control operations may, for example, include: a stop operation to stop the presentation; a pause operation to pause the presentation; a fast-forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow-motion presentation of the volumetric video).

For some embodiments, a user may specify input indicative of a control operation for controlling presentation of volumetric content by providing one or more inputs via one or more I/O components (examples of which are described in further detail below in reference to FIG. 10). For some embodiments, the presentation control system 404 may provide an interactive control interface comprising one or more interactive elements (e.g., virtual buttons) to trigger a control operation and the presentation control system 404 monitors interaction with the interactive interface to detect input indicative of a control operation. For some embodiments, a user may trigger a control operation using a gesture such as a hand or head gesture that can be associated with a specific control operation.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The augmentation system 406 operatively supplies one or more media overlays to the presentation client 104 based on a geolocation of the client device 102 or based on other information, such as social network information of the user of the client device 102. The media overlays may be stored in the database 120 and accessed through the database server 118.

Filters are an example of media overlays that are displayed as overlaid on an image or video during presentation to a user. Filters may be of various types, including user-selected filters from a set of filters presented to a user by the presentation client 104. Other types of filters include geolocation filters (also known as geo-filters), which may be presented to a user based on geographic location. For example, geolocation filters specific to a neighborhood or special location may be presented within a user interface by the presentation client 104, based on geolocation information determined by a Global Positioning System (GPS) unit of the client device 102.

Another type of filter is a data filter, which may be selectively presented to a user by the presentation client 104, based on other inputs or information gathered by the client device 102. Examples of data filters include current temperature at a specific location, a current speed at which a sending user is traveling, battery life for a client device 102, or the current time.

AR content items are another example of media overlays. An AR content item may be a real-time special effect and/or sound that can be added to an image or a video including volumetric images and videos.

Generally, AR content items, overlays, image transformations, images, and similar terms refer to modifications that may be applied to image data (e.g., videos or images) including volumetric content. This includes real-time modifications, which modify an image as it is captured using device sensors (e.g., one or multiple cameras) of a client device 102 and then displayed by a display device of the client device 102 (e.g., an embedded display of the client device) with the modifications. This also includes modifications to stored content, such as volumetric videos in a gallery or collection that may be modified. For example, in a client device 102 with access to multiple AR content items, a user can use a single volumetric video with multiple AR content items to see how the different AR content items will modify the stored content. For example, multiple augmented reality content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh can be used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a machine learning model that has been configured to execute efficiently on the client device 102. In some examples, a computer animation model to transform video and image content can be used by the augmentation system 406 where a neural network operates as part of a presentation client application 104 operating on the client device 102.

The machine learning model can be trained using labeled or unlabeled training data that includes ground-truth information. For example, one or more images depicting a partial and/or whole body of a person can be included in the training data along with the ground-truth segmentation information defining the current positions of limbs and joins of the whole body of the user (e.g., position of arms, torso, legs, head, shoulders, and so forth). The machine learning model can be applied to a subset of the training data, such as one or more images in the training data and can generate an estimate or prediction about the ground-truth segmentation information defining the current positions of limbs and joins of the whole body of the user (e.g., position of arms, torso, legs, head, shoulders, and so forth). The estimate or prediction can be compared with the corresponding ground-truth information to compute a deviation. The deviation can then be used to update one or more parameters of the machine learning model. After updating the one or more parameters, the machine learning model is applied to another subset of the training data and these operations are repeated until a stopping criterion is reached.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example.

The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages detecting urgency in the message, detecting a relationship of the user to the sender, calculating score attributes, calculating message scores, etc.

With the training data and the identified features, the machine-learning tool is trained at machine-learning program training. The machine-learning tool appraises the value of the features as they correlate to the training data. The result of the training is the trained machine-learning program.

When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing query data to generate outcomes or predictions, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment.

With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a deep neural network that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases, the trained machine-learning program is used to perform an assessment. Query data is provided as an input to the trained machine-learning program, and the trained machine-learning program, generates the assessment as output, responsive to receipt of the query data.

The device configuration system 408 is responsible for determining and configuring device states. Device state data defines a state of a network-connected device. The state of the network-connected device may be specified by a user or determined from any one or more of the network-connected device, a network service in communication with the network-connected device, or sensor data from one or more sensors that indicates one or more aspects of the operation or output of the network-connect device. Accordingly, the device configuration system 408 may determine a state of a network-connected device by sending one or more requests for device state data to the network-connected device or a network-service of the network-connected device, and/or by collecting sensor data from one or more sensors.

For some devices, the state of a device corresponds to a particular configuration of the device. For example, the state of a network-connected device may comprise one or more device settings that define aspects of the operation or output of the device. In some instances, the network-connected device is a network-connected media device such as a smart television or speaker, and in these instances, the state may identify secondary content such as video, image, and/or audio content presented by the media device. In some instances, the network-connected device is a navigation device or other device providing navigation capabilities, and the device state data includes navigation data, which may, for example, include a path or route between two locations.

For some embodiments, the state of the network-connected device may correspond to a state of the network-connected device during volumetric capture of a user experience. For these embodiments, the device configuration system 408 can determine the state in real time as the volumetric capture is occurring or at later time subsequent to the volumetric capture.

The multisensory experience generation system 410 is responsible for associating volumetric content with determined device states to memorialize user experiences. To this end, the multisensory experience generation system 410 can generate experience data for a volumetrically captured experience that includes virtual content and associated device state data. When a request for presentation of the virtual content is received, the volumetric content presentation system 100 accesses device state data associated with the volumetric content from the experience data and uses the device state data to configure one or more network-connected devices as part of the presentation of the volumetric content.

For some embodiments, the multisensory experience generation system 410 is further responsible for generating volumetric content based on volumetric data generated as part of a volumetric capture process. Consistent with these embodiments, known volumetric capture techniques that involve using one or more cameras and sensors along with motion capture techniques to capture a three-dimensional space can be employed. Camera data (e.g., image and video data) captures the three-dimensional space from multiple angles that the multisensory experience generation system 410 can stitch together to generate three-dimensional models of the elements in the space, which can be further enhanced with sensor data that, for example, provides more detailed spatial information for the elements of the three-dimensional space. Accordingly, the multisensory experience generation system 410 may aggregate, process, and augment image, audio, video, and sensor data from cameras and sensors to generate volumetric content that can be presented as part of an AR experience by an AR device such as the glasses 200.

Figure 5:
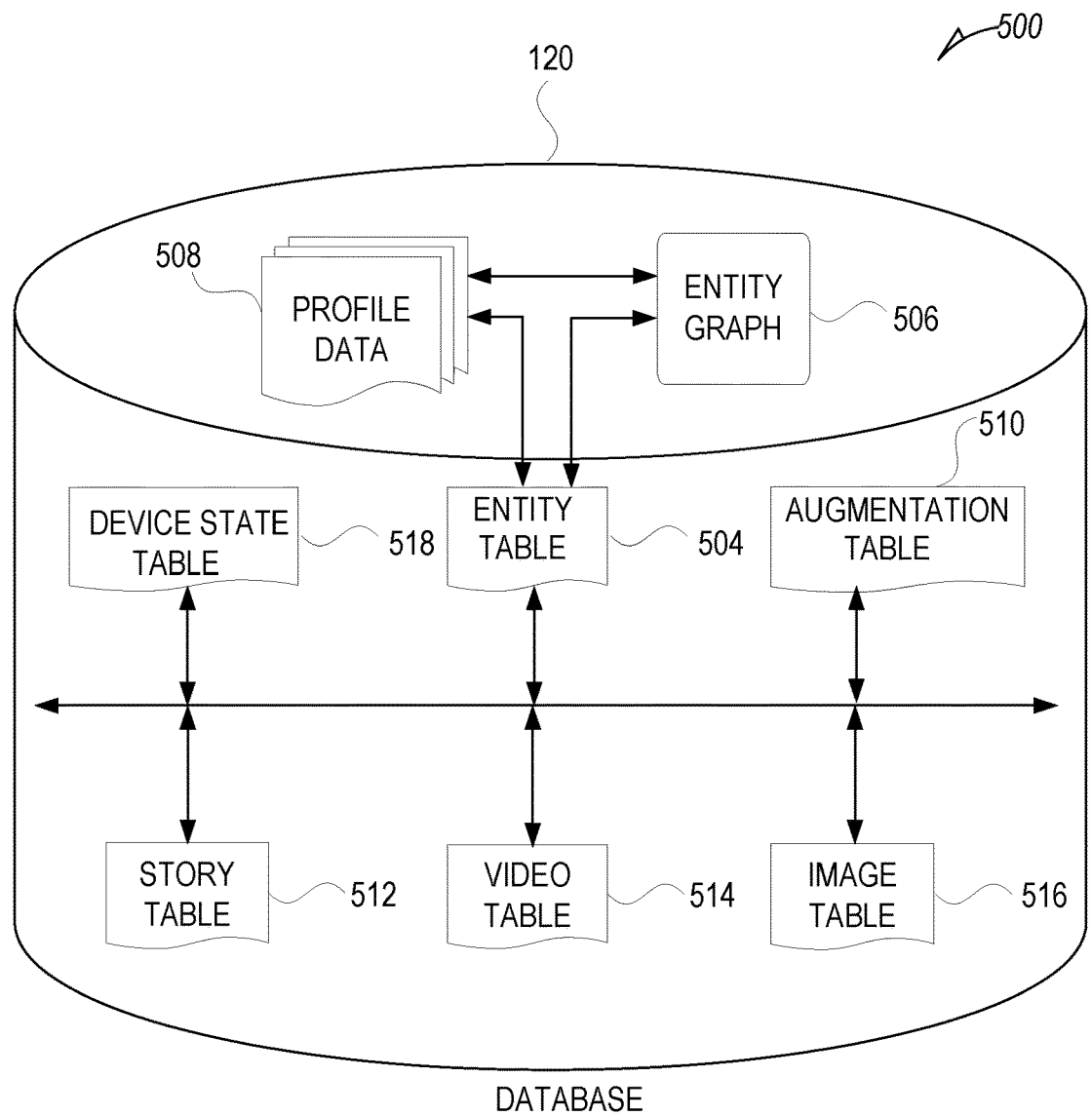
FIG. 5 is a diagrammatic representation of a data structure as maintained in a database, in accordance with some example embodiments.

FIG. 5 is a diagrammatic representation of a data structure 500 as maintained in the database 120, in accordance with some examples. While the content of the database 120 is shown to comprise a number of tables, it will be appreciated that the data could be stored in other types of data structures (e.g., as an object-oriented database).

An entity table 504 stores entity data, and is linked (e.g., referentially) to an entity graph 506 and profile data 508. Entities for which records are maintained within the entity table 504 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown). The entity table 504 may associate various augmentations from the augmentation table 510 with various images and videos stored in the image table 516 and the video table 514.

The entity graph 506 stores information regarding relationships and associations between entities. Such relationships may be social, professional (e.g., work at a common corporation or organization) interested-based or activity-based, merely for example.

The profile data 508 stores multiple types of profile data about a particular entity. The profile data 508 may be selectively used and presented to other users of the volumetric content presentation system 100, based on privacy settings specified by a particular entity. Where the entity is an individual, the profile data 508 includes, for example, a user name, telephone number, address, settings (e.g., notification and privacy settings), as well as a user-selected avatar representation (or collection of such avatar representations).

The database 120 also stores augmentation data, such as overlays including AR content items and filters, in an augmentation table 510. The augmentation data is associated with and applied to videos (for which data is stored in a video table 514) and images (for which data is stored in an image table 516) including volumetric videos and images.

A story table 512 stores data regarding collections of content including associated image, video, or audio data that are compiled into a collection (e.g., a story or a gallery). The creation of a particular collection may be initiated by a particular user (e.g., each user for which a record is maintained in the entity table 504). A user may create a "personal story" in the form of a collection of content that has been created and sent/broadcast by that user. To this end, the user interface of the presentation client 104 may include an icon that is user-selectable to enable a sending user to add specific content to his or her personal story.

As mentioned above, the video table 514 stores video data that includes volumetric videos. Similarly, the image table 516 stores image data that that includes volumetric images.

In addition, the database 120 can also store device state data in a device state table 518. Device state data describes states of network-connected devices. Depending on the device, the device state data may specify a configuration of a device such as controlled by one or more device settings, secondary content, or navigation data. Entries in the device state table 518 can be associated with videos (for which data is stored in a video table 514) and images (for which data is stored in an image table 516) including volumetric videos and images. For example, as will be discussed in further detail below, the volumetric content presentation system 100 may associate device state data with volumetric content in generating experience data that memorializes a user experience.

Figure 6:
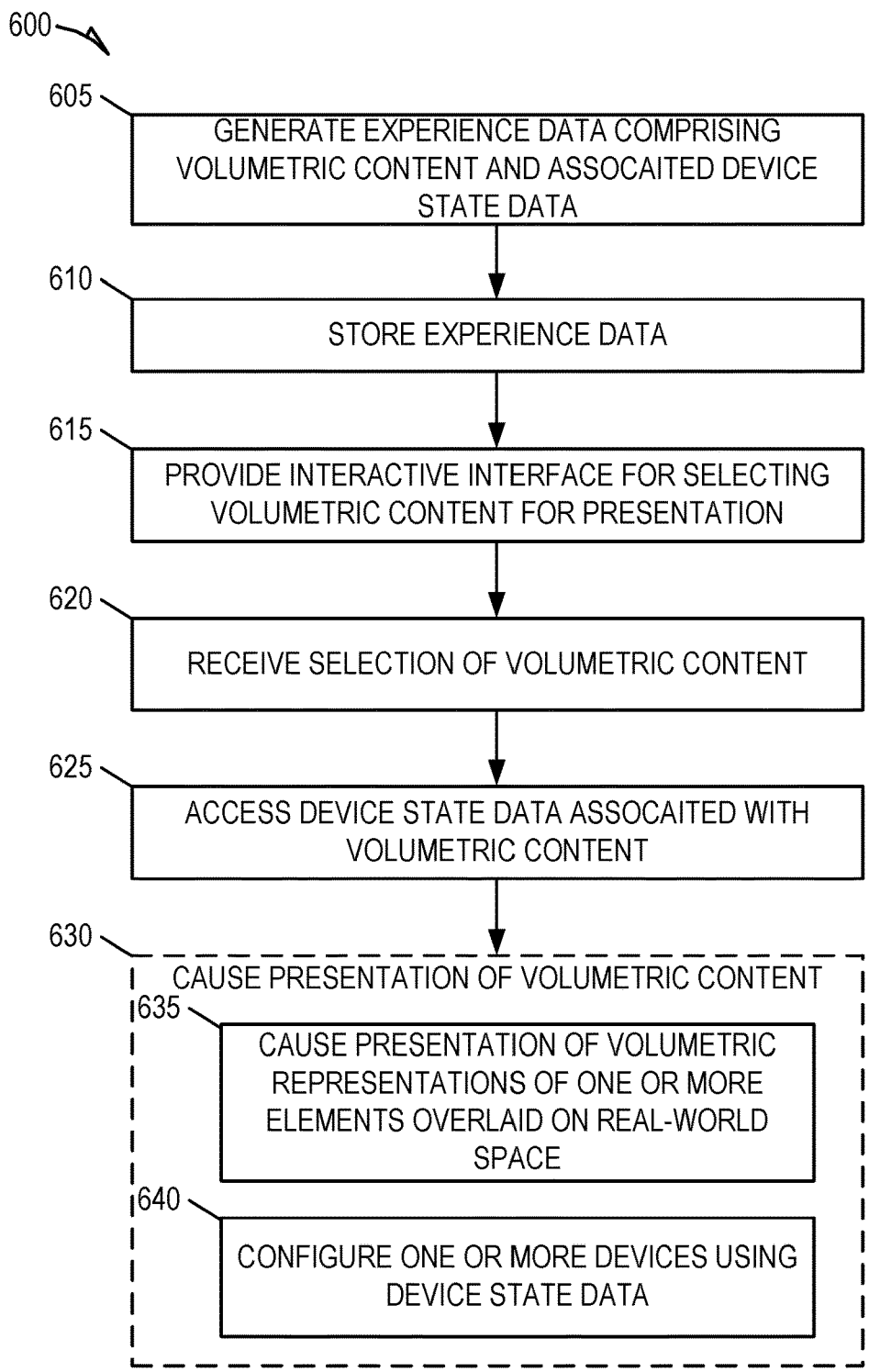
FIGS. 6-8 are flowcharts illustrating operations of the volumetric content presentation system in performing a method for presenting a volumetric video, according to example embodiments.
Figure 7:
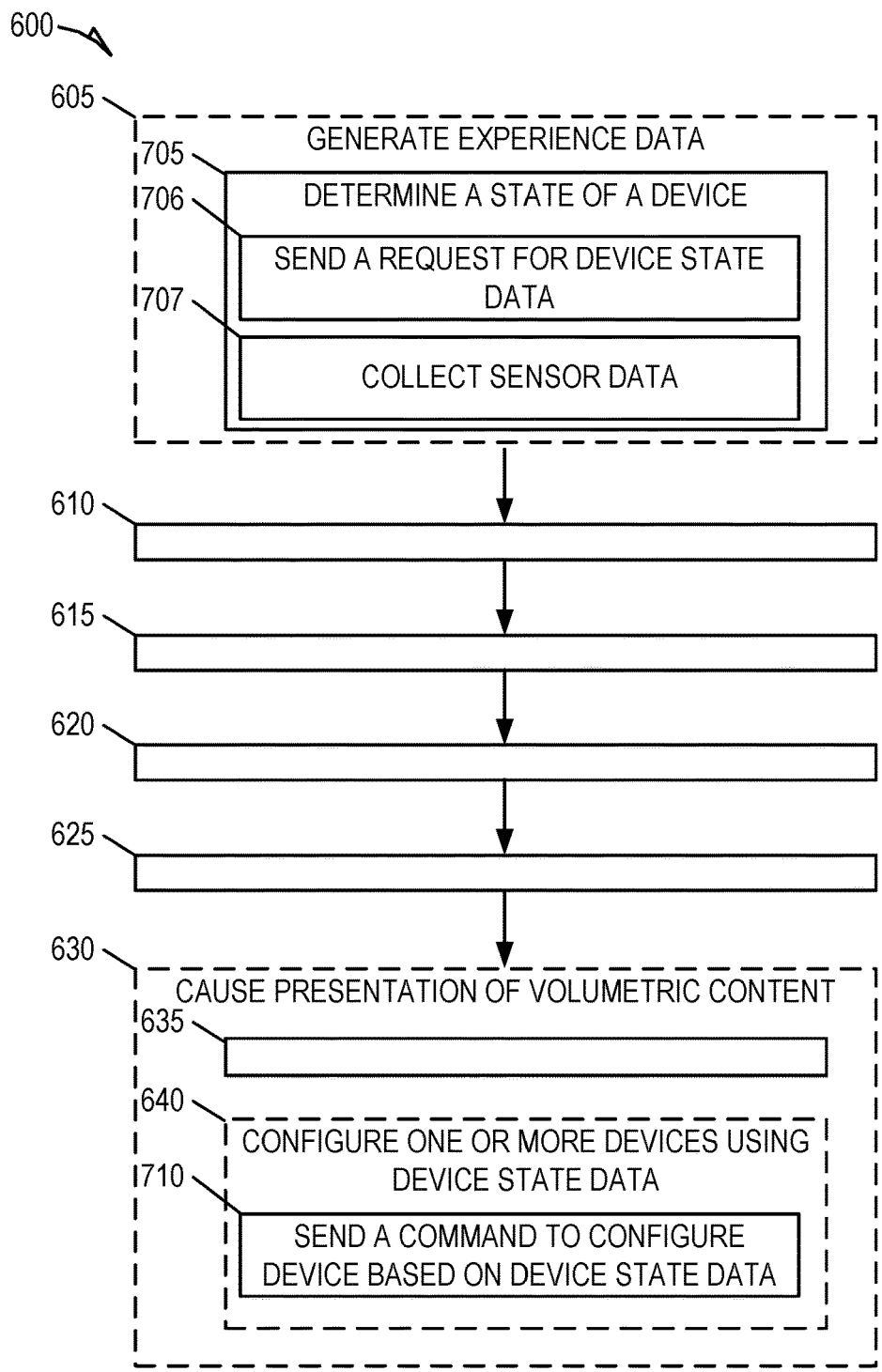
Figure 8:
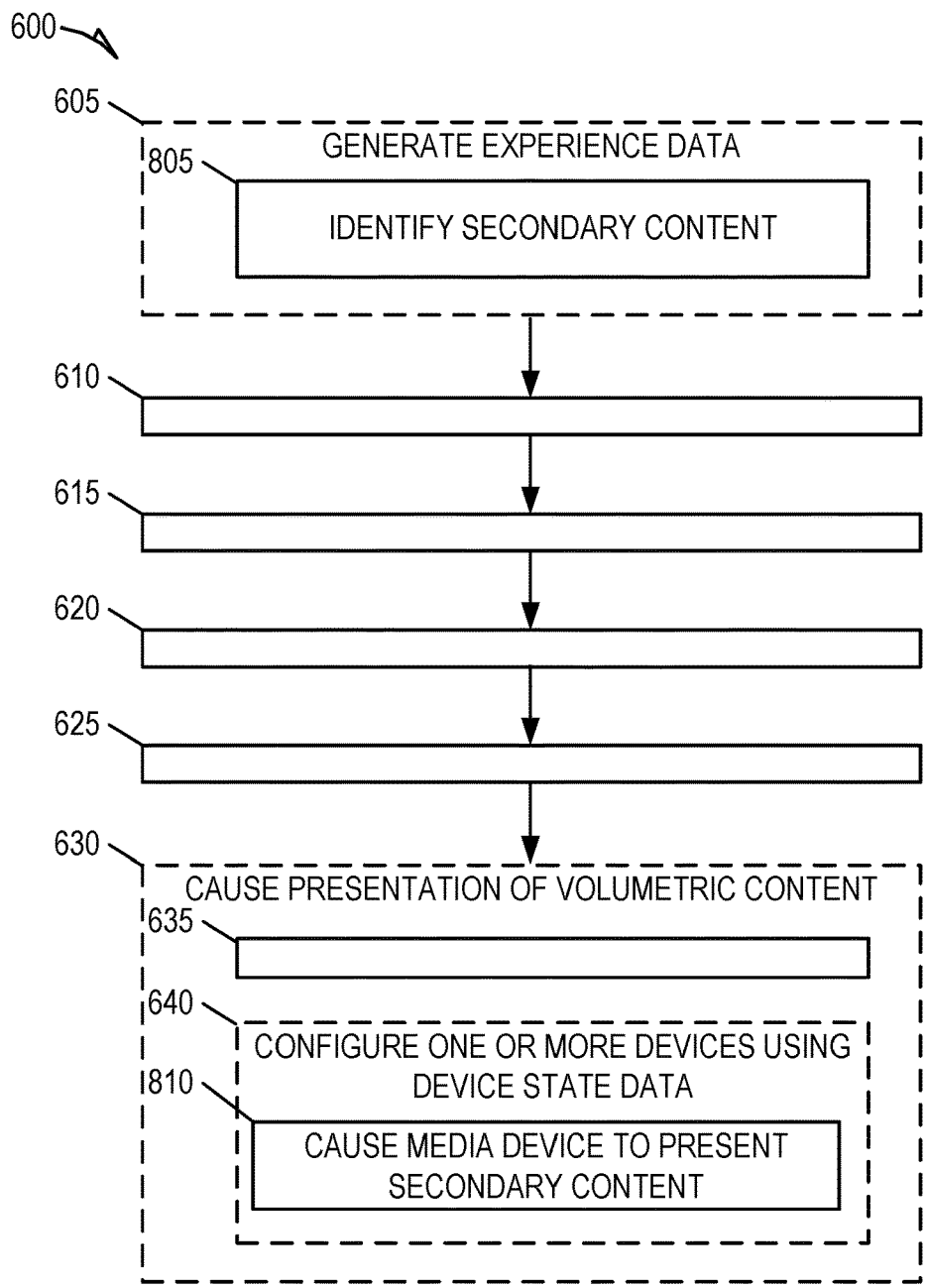

FIGS. 6-8 are flowcharts illustrating operations of the volumetric content presentation system 100 in performing a method 600 for presenting a volumetric video, according to example embodiments. The method 600 may be embodied in computer-readable instructions for execution by one or more processors such that the operations of the method 600 may be performed in part or in whole by the functional components of the volumetric content presentation system 100; accordingly, the method 600 is described below by way of example with reference thereto. However, it shall be appreciated that at least some of the operations of the method 600 may be deployed on various other hardware configurations than the volumetric content presentation system 100.

At operation 605, the volumetric content presentation system 100 generates experience data to memorialize an experience of a user recorded using volumetric capture techniques. The experience data comprises volumetric content and device state data associated with the volumetric content. The volumetric content corresponds to the volumetric capture of the user experience and comprises a volumetric representation of one or more elements of a real-world three-dimensional space during the user experience. That is, the volumetric representation includes at least one content item (e.g., an AR content item) corresponding to a person or object in the three-dimensional space. The device state data describes a state of one or more network-connected devices (e.g., one or more network-connected devices 130) associated with the real-world three-dimensional space.

For some embodiments, the generating of the experience data comprises generating the volumetric content. For example, the volumetric content presentation system 100 may generate volumetric content by stitching together various video, image, audio, and sensor data generated through known volumetric capture techniques. The video, image, audio, and sensor data be provided by a user to the volumetric content presentation system 100, for example, as part of a request for generating volumetric content. For some embodiments, a request for generating volumetric content can include device state data to be associated with the volumetric content. For some embodiments, a request for generating volumetric content includes login credentials used for accessing device state data (e.g., directly from a network-connected device or a third-party network service).

As noted above, the one or more network-connected devices can, for example, include any one or more of: a smart lamp or lightbulb, a thermostat, a navigation device, smart television, a smart speaker, a smart switch, or a smart appliances such as washers, dryers, ranges, and microwaves.

The device state data may include states of one or more devices in the real-world three-dimensional space or part of the same environment as the real-world three-dimensional space. For example, the real-world three-dimensional space may be a room within a house, and a network-connected device for which there is device state data in the experience data may be positioned within the room or outside the room, but within the house. Generally, the device state data can include states of any device for which operation or output can be observed within the real-world three-dimensional space. The device state data can include a state of a network-connected device during the volumetric capture of the user experience or a user specified device state for association with the volumetric content.

At operation 610, the volumetric content presentation system 100 stores the experience data in a network-accessible data store (e.g., the database 120). The network-accessible data store may comprise a collection of experience data, which may include experience data of the user as well as other users' experience data who have permitted access by the user.

The volumetric content presentation system 100 provides an interactive interface to a display device (e.g., glasses 200) that allows the user to select a volumetric content collection of volumetric content for presentation, at operation 615. The collection of volumetric content includes at least the volumetric content included in the experience data generated at operation 605, and may further include other volumetric content that may correspond to other experience data in a collection of experience data that is accessible by the user. The volumetric content presentation system 100, at operation 620, receives input indicative of a selection of the volumetric content for presentation.

In response to the selection of the volumetric content for presentation, the volumetric content presentation system 100 accesses the device state data in the experience data (operation 625) and causes presentation of the volumetric content (operation 630). To cause presentation of the volumetric content, the volumetric content presentation system 100 causes a display device to present the volumetric content (at operation 635) and configures the one or more network-connected devices using the device state data (operation 640).

For some embodiments, the display device is an augmented reality device (e.g., the glasses 200) and the presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may also include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. The location and movement of the user may be tracked based on data from motion and position components (examples of which are described in further detail below in reference to FIG. 10) of any one or more of the display device, a primary device to which the display device is a complementary device thereof, or a complementary device (e.g., a smart watch) in communication with the display device.

The volumetric content may further include audio data comprising one or more audio signals and as such, the presentation of the volumetric content can include presenting one or more audio signals.

As noted above, the device state data can include a state of a network-connected device during the volumetric capture of the user experience. Accordingly, in some instances, configuring the one or more network-connected devices comprises configuring a network-connected device according to a state of the network-connected device during the volumetric capture of the user experience so as to place the device in the same state as when the user experience occurred. Examples of configuring a network-connected device using the device state data include: setting a temperature of a smart thermostat; causing a navigation device to display a navigation path; causing a smart television to play a movie or other secondary video content; causing a smart speaker to play a song; causing a smart coffee maker to brew coffee; placing a smart lock in a locked or unlocked state; causing a smart dishwasher or washing machine to start a cycle; turning a smart light on or off; dimming a smart light; starting, stopping, or changing a speed of a smart fan; and causing a smart door to open or close.

Further details of configuring the one or more network-connected device are discussed below.

As shown in FIG. 7, the method 600 can, in some embodiments, include operations 705 and 710. Consistent with these embodiments, the operation 705 can be performed as part of the operation 605 where the volumetric content presentation system 100 generates the experience data. At operation 705, the volumetric content presentation system 100 determines a state of a network-connected device during the volumetric capture of the user experience. In other words, the volumetric content presentation system 100 determines the state of the network-connected device at the time of capturing the volumetric content. For some devices, the state of a device corresponds to a particular state of the device. For example, the device state data may, for example, include one or more device settings of the network-connected device. For some devices, the device state data may include map or location data including, for example, data defining a path or route between two locations. The volumetric content presentation system 100 may determine the state in real-time as the volumetric capture is being performed or subsequent to the volumetric capture.

As shown, in determining the state of the network-connected device, the volumetric content presentation system 100 can perform any one of operations 706 and 707. At operation 706, the volumetric content presentation system 100 sends, over a network, a request for the device state data to the network-connected device or a network service associated with the network-connected device (e.g., via an API of the device or the network service). At operation 707, the volumetric content presentation system 100 collects sensor data from one or more sensors associated with the real-world three-dimensional space. The one or more sensors may, for example, include an embedded sensor of the network-connected device, a sensor that is communicatively coupled with the network-connected device, or a sensor in the real-world three-dimensional space or an associated real-world environment that is capable of sensing one or more aspects of the operation of the network-connected device.

Consistent with these embodiments, the operation 710 can be performed as part of the operation 635 where the volumetric content presentation system 100 configures the one or more network-connected devices. At operation 710, the volumetric content presentation system 100 sends a command, over the network, to the network-connected device or the network service associated with the network-connected device to configure the device according to the state of the device at the time of capturing the volumetric content, such that the network-connected device is configured with the same state as when the user experience occurred. As noted above, the state of the device may comprise one or more device settings, and thus configuring the network-connected device can include applying the one or more device settings to the network-connected device.

As shown in FIG. 8, the method 600 can, in some embodiments, include operations 805 and 810. Consistent with these embodiments, the operation 805 can be performed as part of the operation 605 where the volumetric content presentation system 100 generates the experience data. At operation 805, the volumetric content presentation system 100 identifies secondary content associated with the volumetric content. The secondary content can include any one or more of audio, image, or video content, the presentation of which was observable within the real-world three-dimensional space during the volumetric capture of the user experience.

For some embodiments, the volumetric content presentation system 100 identifies the secondary content based on an analysis of the volumetric content. For some embodiments, the volumetric content presentation system 100 identifies the secondary content based on user input that includes an identifier of the secondary content. For some embodiments, the volumetric content presentation system 100 identifies the secondary content by sending one or more requests, over the network, to a network-connected media device (e.g., a smart television or other network-connected display device or a smart speaker or other network-connected audio device) or a network service associated with the network-connected media device (e.g., via an API of the device or the network service).

Consistent with these embodiments, the operation 810 can be performed as part of the operation 635 where the volumetric content presentation system 100 configures the one or more network-connected devices as part of the presentation of the volumetric content. At operation 810, the volumetric content presentation system 100 causes a network-connected media device to present the secondary content. The network-connected media device may be the same media device that presented the secondary content during the volumetric capture or a different media device that is capable of presenting the secondary content. The volumetric content presentation system 100 may, for example, cause the network-connected media device to present the secondary content by sending one or more commands, over the network, to the network-connected media device or the network service associated with the network-connected media device. By causing the network-connected device to present the secondary content along with the presentation of the volumetric content, the volumetric content presentation system 100 is able to provide a recreation of the user experience.

Software Architecture

Figure 9:
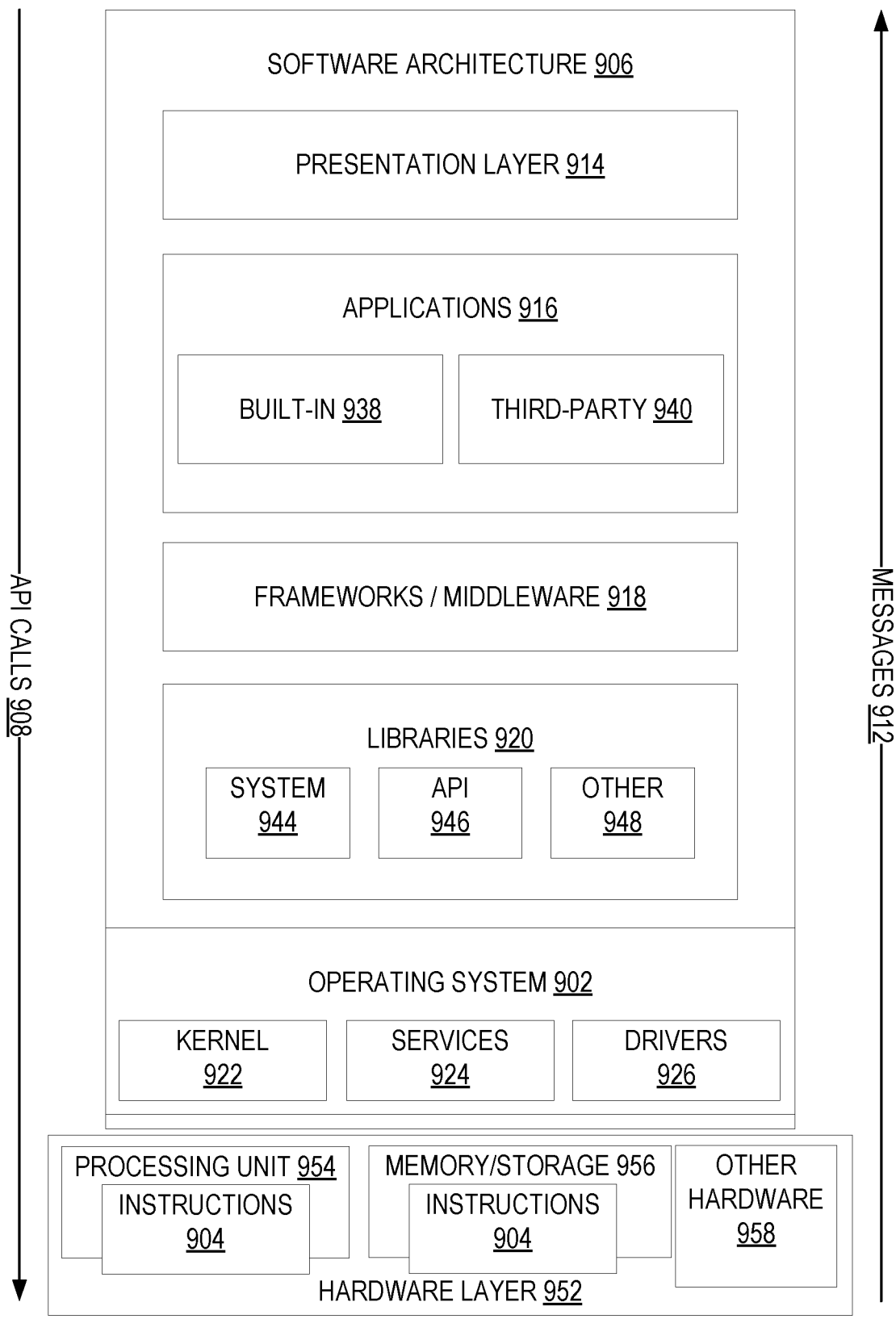
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors 1004, memory/storage 1006, and I/O components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response to the API calls 908 as messages 912. The layers illustrated are representative in nature and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various GUI functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as the presentation layer 914. In these systems, the application/component "logic" can be separated from the aspects of the application/component that interact with a user.

Figure 10:
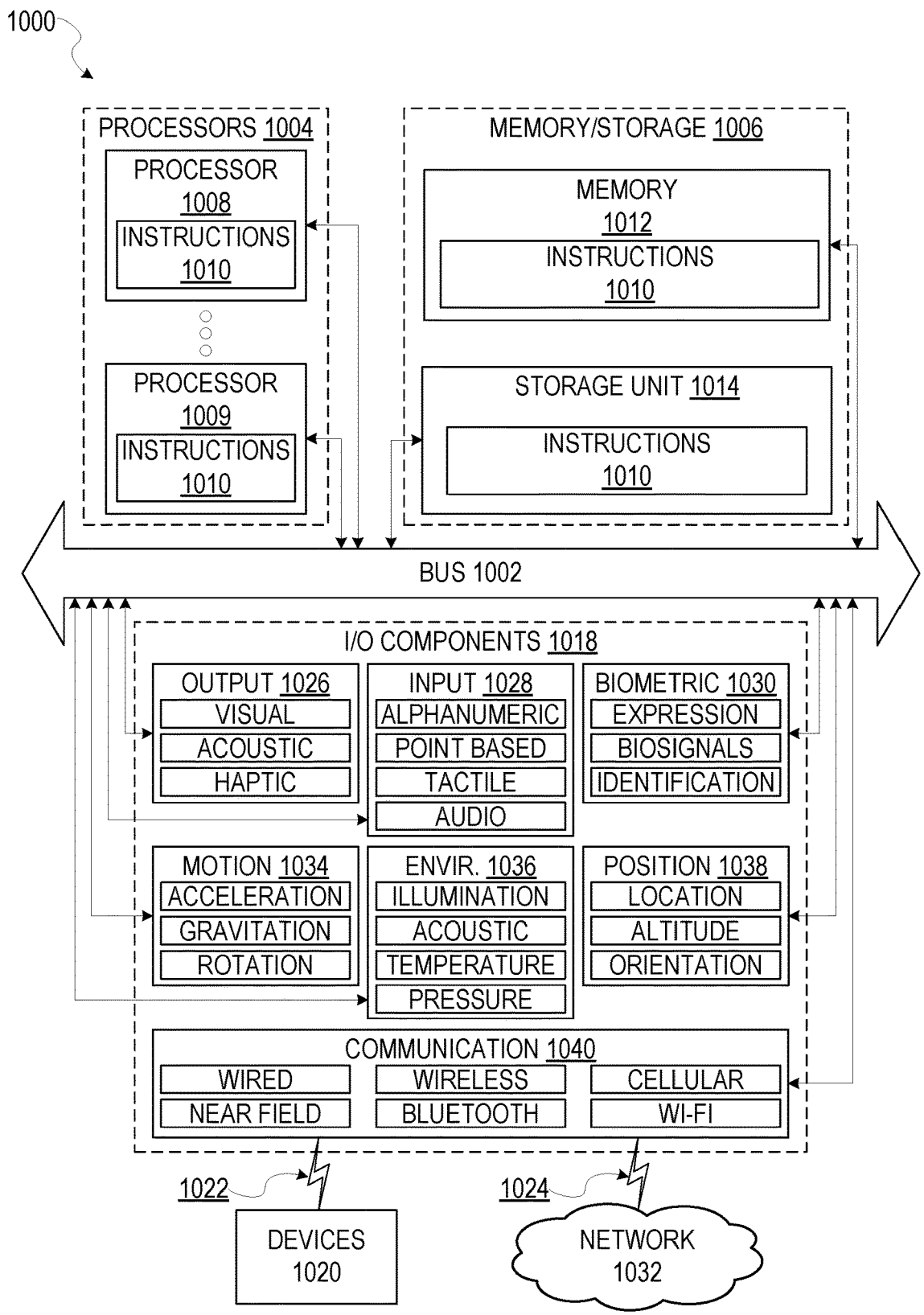
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1008 and a processor 1009 that may execute the instructions 1010. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1012, such as a main memory, or other memory storage, and a storage unit 1014, both accessible to the processors 1004 such as via the bus 1002. The storage unit 1014 and memory 1012 store the instructions 1010 embodying any one or more of the methodologies or functions described herein. The instructions 1010 may also reside, completely or partially, within the memory 1012, within the storage unit 1014, within at least one of the processors 1004 (e.g., within the processor's cache memory), or any suitable combination thereof, during execution thereof by the machine 1000. Accordingly, the memory 1012, the storage unit 1014, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
   receiving input indicative of a selection of volumetric content for presentation, the volumetric content comprising a volumetric representation of one or more elements of a real-world three-dimensional space;
   in response to the input, accessing device state data associated with the volumetric content, the device state data describing a state of one or more network-connected devices associated with the real-world three-dimensional space; and
   causing presentation of the volumetric content, the causing of the presentation of the volumetric content comprising:
   causing, by a display device that is distinct from the one or more network-connected devices, presentation of the volumetric representation of the one or more elements overlaid on the real-world three-dimensional space; and
   configuring the one or more network-connected devices using the device state data, the configuring of the one or more network-connected devices comprises sending, over a network, a command to a network-connected device located within the real-world three-dimensional space corresponding to the volumetric representation or to a network service associated with the network-connected device, the command causing the network-connected device to be configured according to a state of the network-connected device while the volumetric content was being captured.

2. The method of claim 1, further comprising generating a data record comprising the volumetric content and the device state data.

3. The method of claim 2, wherein the generating of the data record comprises determining the state of the one or more network-connected devices at a time of capturing the volumetric content.

4. The method of claim 3, wherein determining the state of the one or more network-connected devices comprises sending, over the network, a request for the state data to the network-connected device or the network service associated with the network-connected device.

5. The method of claim 3, wherein determining the state of the one or more network-connected devices comprises collecting sensor data from one or more sensors associated with the real-world three-dimensional space.

6. The method of claim 2, wherein the generating of the record comprises combining video data, image data, audio data, and sensor data associated with the real-world three-dimensional space.

7. The method of claim 1, wherein causing presentation of the volumetric content includes: displaying at least one element of the real-world three-dimensional space from multiple perspectives based on user movement.

8. The method of claim 1, wherein the configuring of the one or more network-connected devices comprises one or more of: setting a temperature of a smart thermostat causing a navigation device to display a navigation path; causing a smart television to present secondary video content; causing a smart speaker to play a song; causing a smart coffee maker to brew coffee; placing a smart lock in a locked or unlocked state; causing a smart dishwasher to start a cycle; causing a washing machine to start a cycle turning a smart light on or off; dimming a smart light; starting, stopping, or changing a speed of a smart fan; and causing a smart door to open or close.

9. The method of claim 1, further comprising identifying secondary content that was presented within the real-world three-dimensional space while the volumetric content was being captured, wherein the configuring of the one or more network-connected devices comprises causing presentation, by a media device, of the secondary content.

10. The method of claim 1, wherein:
the device state data includes one or more device settings of the network-connected device; and
the configuring of the one or more network-connected devices comprises applying the one or more device settings to the network-connected device.

11. A system comprising:
one or more hardware processors; and
at least one memory storing instructions that cause the one or more hardware processors to perform operations comprising:
receiving input indicative of a selection of volumetric content for presentation, the volumetric content comprising a volumetric representation of one or more elements of a real-world three-dimensional space;
in response to the input, accessing device state data associated with the volumetric content, the device state data describing a state of one or more network-connected devices associated with the real-world three-dimensional space; and
causing presentation of the volumetric content, the causing of the presentation of the volumetric content comprising:
causing, by a display device that is distinct from the one or more network-connected devices, presentation of the volumetric representation of the one or more elements overlaid on the real-world three-dimensional space; and
configuring the one or more network-connected devices using the device state data, the configuring of the one or more network-connected devices comprises sending, over a network, a command to a network-connected device located within the real-world three-dimensional space corresponding to the volumetric representation or to a network service associated with the network-connected device, the command causing the network-connected device to be configured according to a state of the network-connected device while the volumetric content was being captured.

12. The system of claim 11, wherein the operations further comprise generating a data record comprising the volumetric content and the device state data.

13. The system of claim 12, wherein the generating of the data record comprises determining the state of the one or more network-connected devices at a time of capturing the volumetric content.

14. The system of claim 13, wherein determining the state of the one or more network-connected devices comprises sending, over the network, a request for the state data to the network-connected device or the network service associated with the network-connected device.

15. The system of claim 13, wherein determining the state of the one or more network-connected devices comprises collecting sensor data from one or more sensors associated with the real-world three-dimensional space.

16. The system of claim 13, wherein causing presentation of the volumetric content includes: displaying at least one element of the real-world three-dimensional space from multiple perspectives based on user movement.

17. The system of claim 12, wherein the generating of the data record comprises combining video data, image data, audio data, and sensor data associated with the real-world three-dimensional space.

18. The system of claim 11, wherein the configuring of the one or more network-connected device comprises one or more of: setting a temperature of a smart thermostat causing a navigation device to display a navigation path; causing a smart television to present secondary video content; causing a smart speaker to play a song; causing a smart coffee maker to brew coffee; placing a smart lock in a locked or unlocked state; causing a smart dishwasher to start a cycle; causing a washing machine to start a cycle turning a smart light on or off; dimming a smart light starting, stopping, or changing a speed of a smart fan; and causing a smart door to open or close.

19. The system of claim 11, wherein the operations further comprise identifying secondary content that was presented within the real-world three-dimensional space while the volumetric content was being captured, wherein the configuring of the at least one network-connected device comprises causing presentation, by a media device, of the secondary content.

20. A machine-readable medium storing instructions that, when executed by a computer system, cause the computer system to perform operations comprising:
receiving input indicative of a selection of volumetric content for presentation, the volumetric content comprising a volumetric representation of one or more elements of a real-world three-dimensional space;
in response to the input, accessing device state data associated with the volumetric content, the device state data describing a state of one or more network-connected devices associated with the real-world three-dimensional space; and
causing presentation of the volumetric content, the causing of the presentation of the volumetric content comprising:
causing, by a display device that is distinct from the one or more network-connected devices, presentation of the volumetric representation of the one or more elements overlaid on the real-world three-dimensional space; and
configuring the one or more network-connected devices using the device state data, the configuring of the one or more network-connected devices comprises sending, over a network, a command to a network-connected device located within the real-world three-dimensional space corresponding to the volumetric representation or to a network service associated with the network-connected device, the command causing the network-connected device to be configured according to a state of the network-connected device while the volumetric content was being captured.

* * * * *

UNITED STATES PATENT AND TRADEMARK OFFICE
CERTIFICATE OF CORRECTION

PATENT NO. : 11,972,521 B2  
APPLICATION NO. : 17/899970  
DATED : April 30, 2024  
INVENTOR(S) : Vaish et al.

Page 1 of 1

It is certified that error appears in the above-identified patent and that said Letters Patent is hereby corrected as shown below:

In the Claims

In Column 31, Line 3, in Claim 8, after "thermostat", insert --;--

In Column 32, Line 18, in Claim 18, after "thermostat", insert --;--

In Column 32, Line 25, in Claim 18, after "light", insert --;--

Signed and Sealed this  
Eighth Day of July, 2025

Coke Morgan Stewart  
*Acting Director of the United States Patent and Trademark Office*